No. 801,632. PATENTED OCT. 10, 1905.
T. APPLETON.
VEHICLE WHEEL.
APPLICATION FILED JAN. 25, 1905.

2 SHEETS—SHEET 1.

WITNESSES:

INVENTOR
Thomas Appleton
BY
ATTORNEYS

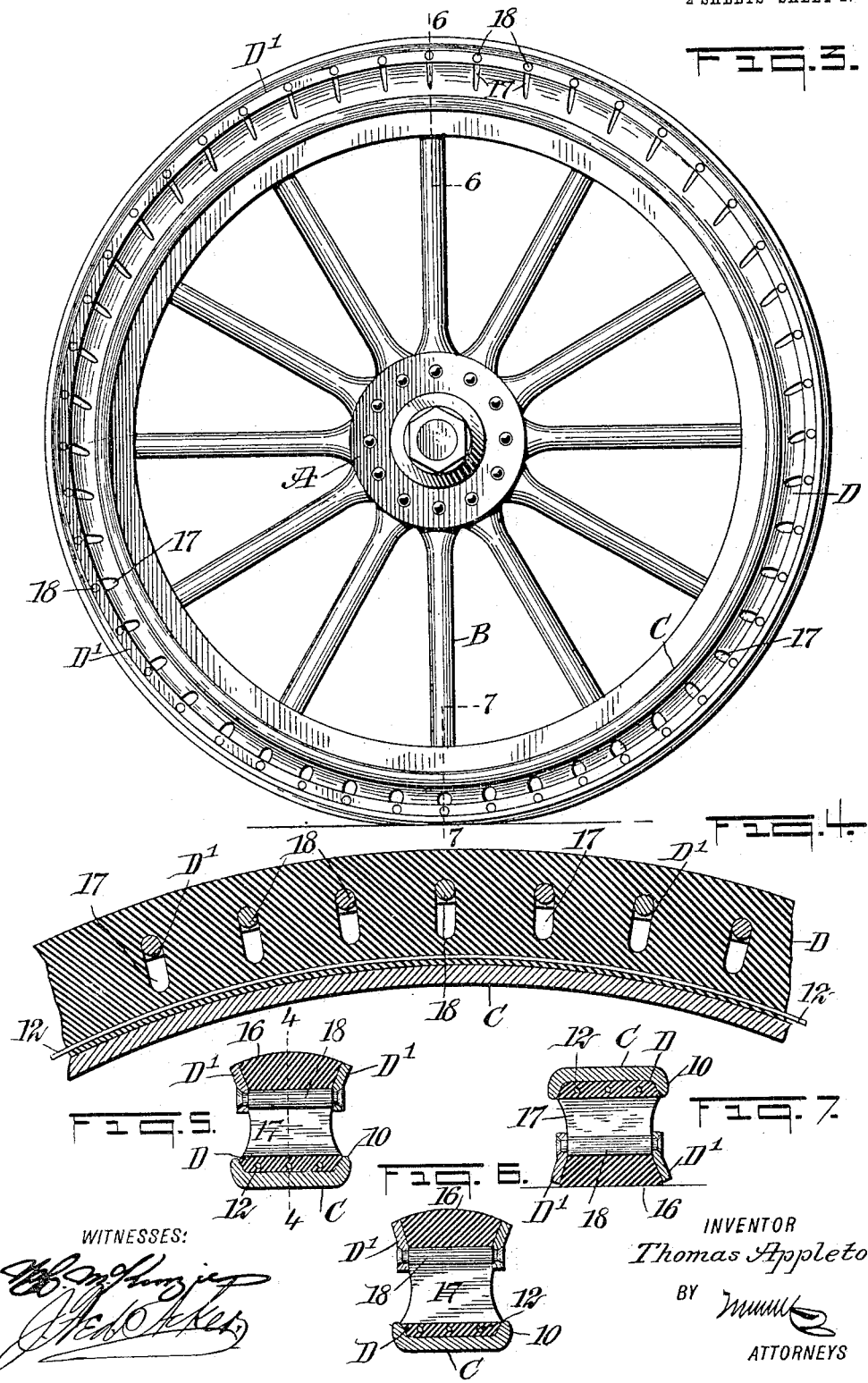

UNITED STATES PATENT OFFICE.

THOMAS APPLETON, OF NEW YORK, N. Y.

VEHICLE-WHEEL.

No. 801,632.　　　　　Specification of Letters Patent.　　　　　Patented Oct. 10, 1905.

Application filed January 25, 1905. Serial No. 242,587.

*To all whom it may concern:*

Be it known that I, THOMAS APPLETON, a citizen of the United States, and a resident of the city of New York, borough of Brooklyn, in the county of Kings and State of New York, have invented a new and useful Improvement in Vehicle-Wheels, of which the following is a full, clear, and exact description.

The purpose of the invention is to provide a cushion-tire for vehicle-wheels, particularly wheels used upon automobiles, and to so construct the tire that it will be gradually compressed under the weight of the vehicle where it engages with the ground and gradually expanded throughout the remaining portion of its surface, providing for a minimum of shock while passing over uneven ground and a maximum of elasticity.

Another purpose of the invention is to provide a vehicle-tire of the character described which can be readily applied to any wheel and which will be simple, durable, and economic in its construction.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
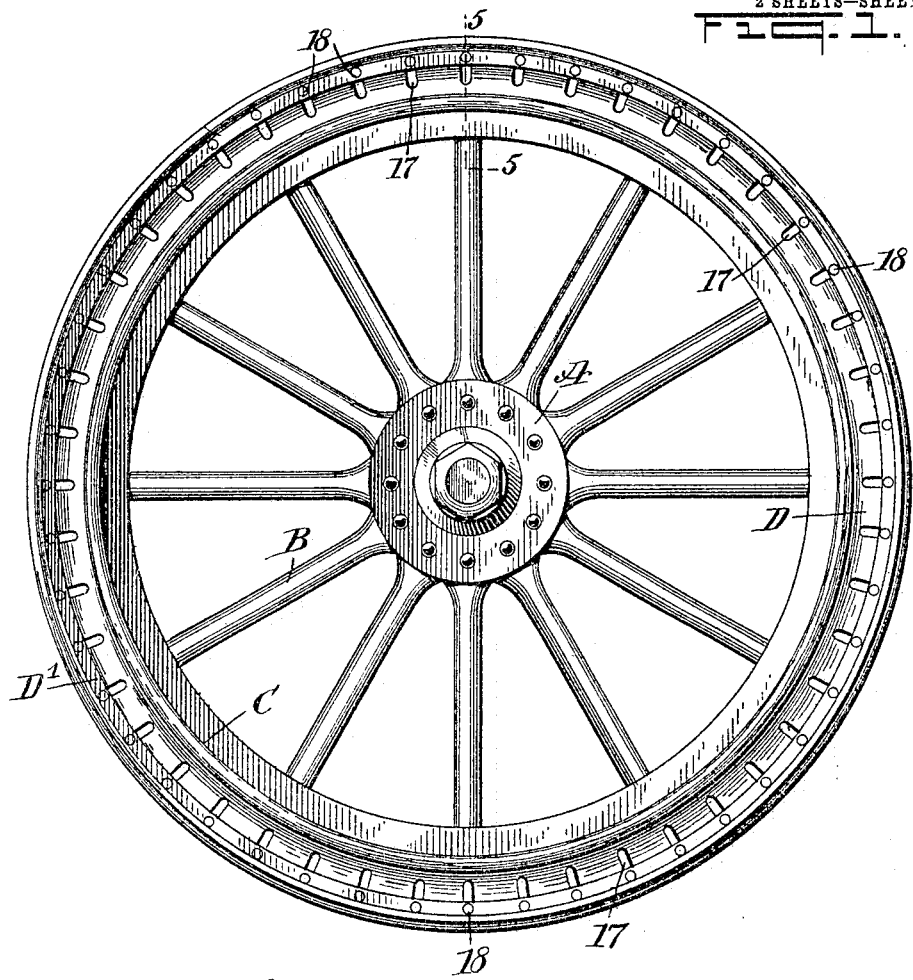
Figure 2:
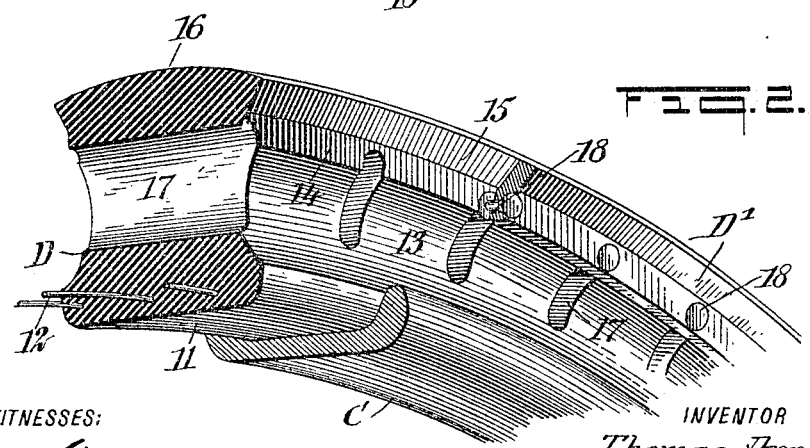

Figure 1 is a side elevation of a wheel and the improved tire applied, the tire being in normal position. Fig. 2 is a perspective view of a fragment of the improved tire and rim of the wheel, the view being drawn upon an enlarged scale. Fig. 3 is a side elevation of a wheel having the improved tire applied, illustrating the action of the tire when the wheel is applied to a vehicle. Fig. 4 is a longitudinal section through the tire and rim, the section being taken on the line 4 4 of Fig. 5. Fig. 5 is a transverse section taken on the line 5 5 of Fig. 1. Fig. 6 is a transverse section taken on the line 6 6 of Fig. 3, and Fig. 7 is a transverse section taken on the line 7 7 of Fig. 3.

A represents the hub of the wheel, B the spokes, and C the rim, which rim is provided with side flanges 10, as is best shown in Figs. 5, 6, and 7. The body D of the tire is made of rubber or other elastic material and is practically solid, and the inner face 11 is fitted to the dished outer face of the rim C of the wheel, being held in said rim by tie-wires 12, which are passed through the body of the tire adjacent to the rim, as is shown in Figs. 2, 4, 5, 6, and 7. The side faces of the body of the tire adjacent to the rim C are rendered more or less concaved, as is shown at 13 in the drawings, and at the outer edges of the curved surfaces 13 flat surfaces 14 are formed, while at the tread of the tire the side surfaces 15 are outwardly flared or beveled, as is particularly shown in Fig. 2, and the tread 16 is more or less convexed. The flat and the flaring side surfaces 14 and 15 are braced by means of rings D', which are made to conform to the said flat surfaces 14 and beveled surfaces 15. Consequently the rings D are angular in cross-section. Further in the construction of the body D of the tire a series of transverse slots or openings 17 is produced, extending through from side to side. These openings are preferably in the nature of slots; but they may be circular in cross-section, if desired, and the said openings 17 are arranged at predetermined distances apart. In assembling the parts of the tire when the body D has been secured to the rim C the brace-rings D' are placed in position on the side faces of the body of the tire, and plain bolts 18 are passed through the said slots 17 at their outer end portions, and the ends of the bolts 18 are riveted or otherwise secured in the brace-rings D', as is clearly shown in Figs. 2, 5, 6, and 7.

When the wheel is normal—that is to say, when it is not subjected to any weight at the hub other than what it is designed to carry— or when the vehicle is traveling over a smooth surface, the bolts or pins 18, which may be in the form of rollers, are at the outer end portions of the slots throughout the entire circumference of the wheel, as shown in Figs. 1, 4, and 5; but when the wheel is subjected to concussion or shock that portion of the tire which is on the ground is compressed, as is shown in Fig. 3, and consequently the openings or slots 17 at that portion of the tire are contracted, and the position of the pins or bolts 18 at the lower portion of the wheel will be that shown in Fig. 7, while the other slots 17 will be gradually elongated, the slots being longest at the top of the wheel, and the bolts or pins 18 at the upper portion of the wheel will occupy the position shown in Fig. 6. Therefore it will be observed that in action under unusual strain or concussion the hub of the wheel is eccentric to the tire, the greatest distance being from the top central portion of the tire to the hub and the least distance in direction of the bottom lower portion of the tire. Thus the concussion is not sustained by the axle, but wholly by the resilient tire. Thus it will be observed that the cushion effect is distributed throughout the entire periphery of the wheel, and as the tire expands in leaving the ground it expands gradually, and the other portions of the tire are correspondingly contracted. In fact, by producing the slots 17 in the tire, as stated, and passing the pins through the slots and through the rigid bracing-rings D' a uniform action of the tire throughout its entire circumference is obtained and at the same time the tire at its tread is rendered perfectly strong and is prevented from unduly spreading, and the tread of the tire is of maximum width.

Having thus described my invention, I claim as new and desire to secure by Letters Patent—

1. In vehicle-wheels, a rim, a solid-rubber tire secured to the rim, having transverse slots therein extending through from side to side, metal braces at the sides of the tire, and pins secured to the said braces and passed through the said slots, normally engaging their outer end walls.

2. In a vehicle-wheel, a tire of resilient material presenting outwardly-diverging cheeks near the tread thereof, and having transverse slots, brace-rings abutting said cheeks, and transverse bolts lying in said slots and connecting said rings.

3. In vehicle-wheels, a rim, a solid-rubber tire secured to the rim, the said tire having curved side faces adjacent to the rim, straight faces adjacent to the concaved faces, and outwardly-flaring faces extending from the outer edges of the straight faces of the tread of the tire, metal braces located in close engagement with the straight and outwardly-flared side faces of the tire, the said tire being provided with a series of transverse slots extending through from side to side, the outer ends of the slots being adjacent to the outwardly-flared side faces of the tire, and pins secured to the said braces, which pins are passed through the slots in the tire, being normally adjacent to the outer end walls of the said slots.

In testimony whereof I have signed my name to this specification in the presence of two subscribing witnesses.

THOMAS APPLETON.

Witnesses:
W. P. BERRIEN,
E. R. SMITH.